United States Patent [19]

Settineri et al.

[11] 4,079,115

[45] Mar. 14, 1978

[54] PROCESS FOR PREPARING IMPROVED TRANSPARENT SHAPED ARTICLES FROM VINYLIDENE CHLORIDE POLYMER COMPOSITIONS MODIFIED WITH A NITRILE CONTAINING ELASTOMER

[75] Inventors: William J. Settineri, Midland; James H. Oswald, Bay City, both of Mich.

[73] Assignee: The Dow Chemical Company, Midland, Mich.

[21] Appl. No.: 645,748

[22] Filed: Dec. 31, 1975

Related U.S. Application Data

[60] Division of Ser. No. 516,347, Oct. 21, 1974, abandoned, which is a continuation of Ser. No. 325,073, Jan. 19, 1973, abandoned.

[51] Int. Cl.$^2$ .............................................. B29B 3/04
[52] U.S. Cl. .................................. 264/322; 260/890; 260/891; 264/101; 264/331; 264/349
[58] Field of Search ............... 264/325, 122, 294, 331, 264/349, 322, 101; 260/890, 891

[56] References Cited

U.S. PATENT DOCUMENTS

| 2,456,454 | 12/1948 | Signer ................................ 260/890 |
| 2,552,904 | 5/1951 | Newberg et al. .................... 260/890 |
| 2,614,094 | 10/1952 | Wheelock ............................ 260/891 |
| 2,658,053 | 11/1953 | Signer ................................ 260/891 |
| 2,851,735 | 9/1958 | Hogg et al. ......................... 264/331 |
| 2,935,763 | 5/1960 | Newman et al. .................... 264/349 |
| 3,444,267 | 5/1969 | Beer .................................... 264/331 |
| 3,658,947 | 4/1972 | Ito et al. ............................. 260/891 |

FOREIGN PATENT DOCUMENTS

| 839,831 | 4/1970 | Canada. |
| 732,668 | 4/1966 | Canada. |
| 599,937 | 3/1948 | United Kingdom. |

Primary Examiner—Jeffery R. Thurlow
Attorney, Agent, or Firm—Ronald G. Brookens

[57] ABSTRACT

An improved process for preparing transparent shaped articles from a vinylidene chloride polymer, said articles having excellent barrier properties and a high degree of clarity, continuity and flexibility such process comprising (1) preparing a substantially homogeneous admixture from (A) a particulate vinylidene chloride polymer having crystalline melting peaks of at least about 175° C. as determined by differential thermal analysis, and (B) a volatile material having dispersed or dissolved therein from about 3 to 20 percent based on vinylidene chloride polymer weight of a nitrile containing elastomer which is compatible with the vinylidene chloride polymer, and wherein the volatile material is a nonsolvent for the vinylidene chloride polymer, then (2) removing the volatile material from the admixture and (3) thermally fabricating the admixture into a shaped article.

5 Claims, No Drawings

PROCESS FOR PREPARING IMPROVED TRANSPARENT SHAPED ARTICLES FROM VINYLIDENE CHLORIDE POLYMER COMPOSITIONS MODIFIED WITH A NITRILE CONTAINING ELASTOMER

CROSS-REFERENCE TO RELATED APPLICATION

This is a division of application Ser. No. 516,347 filed Oct. 21, 1974, now abandoned, which in turn is a continuation of application Ser. No. 325,073 filed Jan. 19, 1973, now abandoned.

BACKGROUND

Known methods for obtaining low temperature flexibility in the normally crystalline vinylidene chloride polymers include: polymerization with other monomers; the addition thereto of relatively small molecules as plasticizers; and mixing the vinylidene chloride polymer with an elastomer, e.g., admixing a vinylidene chloride polymer, in latex form, with a rubbery interpolymer latex, followed by coagulation of the mix, e.g., as disclosed in Canadian Pat. No. 732,668. Such prior methods have not provided, however, shaped articles, e.g., compression molded films, which are clear and homogeneous to the eye, which have the same high crystalline melting point as the starting vinylidene chloride polymer, which exhibit lowered glass transition temperatures and improved low temperature (and room temperature) flexibility as compared to the starting vinylidene chloride polymer, while maintaining to a large degree the excellent barrier properties of the starting vinylidene chloride polymer.

It is the primary object of the present invention to provide a process for producing compositions from which articles having such a desirable combination of properties may be thermally fabricated.

SUMMARY

The above and related objects are achieved by a process comprising (1) preparing a substantially homogeneous admixture from (A) a particulate vinylidene chloride polymer having crystalline melting peaks of at least about 175° C. as determined by differential thermal analysis, and (B) a volatile material having dispersed or dissolved therein from about 3 to 20 percent based on vinylidene chloride polymer weight of a nitrile containing elastomer which is compatible with the vinylidene chloride polymer, and wherein the volatile material is a nonsolvent for the vinylidene chloride polymer, then (2) removing the volatile material from the admixture and (3) thermally fabricating the admixture into a shaped article.

The invention additionally contemplates the preparation of shaped articles from such compositions, wherein the vinylidene chloride polymer is polyvinylidene chloride, by uniformly preheating such compositions to a temperature up to about 200° C. over a period of about 30 seconds in the absence of applied pressure, then substantially immediately thereafter applying to such compositions a uniformly increasing pressure up to an amount of about 20,000 p.s.i. over a period of from about 5 to 10 seconds.

DESCRIPTION OF THE PREFERRED EMBODIMENTS

The nitrile containing elastomers contemplated for use by the present invention may be any such elastomer which is compatible with the vinylidene chloride polymer used. Exemplary of such materials are the rubbery copolymers of between about 80 to 50 weight percent 1,3-butadiene and about 20 to 50 weight percent acrylonitrile or methacrylonitrile. Especially preferred are those rubbery copolymers containing from about 70 to 74 weight percent 1,3-butadiene and about 30 to 26 weight percent acrylonitrile.

The normally crystalline vinylidene chloride polymers applicable for the purposes of the present invention include any such polymer capable of being present in a substantially dry, powdered form while having crystalline melting peaks of at least about 175° C., as determined by differential thermal analysis. Exemplary of an especially preferred material is the homopolymer of vinylidene chloride. Also useful, however, are those polymers containing at least about 70 weight percent of vinylidene chloride in the polymer molecule with the remainder of such molecule consisting of one or more ethylenically unsaturated comonomers. Exemplary of such comonomers are vinyl chloride, vinyl acetate, vinyl propionate, acrylonitrile, acrylic acid, maleic acid, fumaric acid, itaconic acid, anhydrides of these acids, alkyl and aralkyl esters, having 8 or fewer atoms of carbon, of these acids, acrylamide, vinyl alkyl ethers, vinyl alkyl ketones, acrylein, allyl esters and ethers, butadiene, chloroprene, and 2,3-dichlorobutadiene.

The volatile solvent used may be any material which dissolves the nitrile containing elastomer and which is a nonsolvent for the normally crystalline vinylidene chloride polymer. An especially preferred material is methylene chloride.

The polymer blends of the present invention may further include, if desired, plasticizers such as dioctyl phthalate or dibutyl sebacate and the like, generally in the range of about 2 to 10 percent by weight of the blend. Such blends may also include usual amounts of antioxidants, light stabilizers and small amounts of other modifying polymers such as copolymers of vinylidene chloride with acrylonitrile, vinyl chloride or acrylates, while maintaining significantly enhanced clarity, continuity, flexibility and barrier properties over similar blends prepared by prior known methods.

In the process of the present invention, it is critical that a solution of the nitrile containing elastomer be substantially homogeneously admixed with dry, powdered vinylidene chloride polymer. This may be accomplished by admixing a solution of such elastomer with powdered preformed vinylidene chloride polymer or by mass polymerizing vinylidene chloride monomer in the presence of the prescribed solution of nitrile containing elastomer.

The following examples, in which all percentages and parts are by weight, illustrate the present invention:

EXAMPLE 1

A polyvinylidene chloride polymer was prepared by polymerizing 800 ml. of vinylidene chloride monomer in the presence of 2 ml. of isopropylpercarbonate at a temperature of about 20° C. while under nitrogen gas. After about 16 hours of reaction time, 1600 ml. of benzene was added and the polymerization reaction was continued for a total reaction time of about 48 hours.

The polymer was then washed with pentane, filtered and dried. Such polymer was characterized by having crystalline melting peaks at about 200° C. as determined by differential thermal analysis, and having a surface area, as determined by nitrogen adsorption, of 98.9 meters$^2$/gram.

A rubbery copolymer of about 70 to 84 percent by weight 1,3-butadiene and about 30 to 26 percent by weight acrylonitrile having a Mooney Viscosity, ML-4 at 212° F. of about 50 was then dissolved in methylene chloride to form a solution containing 0.074 gram of rubber per gram of solution.

Thereafter, 12.34 grams of the above solution was added to 10 grams of the above described dry polyvinylidene chloride powder and blended therewith in a high speed stirrer for a period of 3 to 5 minutes. The methylene chloride was removed by vacuum drying at a temperature of between about 45° to 50° C. over a period of about 16 hours. The resulting blend contained 8.4 percent by weight rubber. In several additional experiments, using the above-described techniques, blends containing 3.8 percent by weight rubber and 19.6 percent by weight rubber were also prepared.

Individual samples of each blend were then separately formed into individual compression moldings by placing the powder between opposed platens preheated to 205° C. for a period of about 25 seconds, without significant pressure, then increasing the pressure to about 20,000 p.s.i. over a period of from about 5 to 7 seconds. The resulting molded articles comprised a continuous phase of pure polyvinylidene chloride having crystalline melting peaks at about 200° C. as evidenced by the starting polymer, and containing randomly dispersed islands of polymeric modifier.

TABLE I

Physical Properties of Polyvinylidene Chloride Polymers

| | Unmodified | Rubber Modified (% Rubber) | | |
|---|---|---|---|---|
| | | 3.8 | 8.4 | 19.6 |
| Clarity | Clear | Clear | Clear | Clear |
| Hand Flex 13 mil sheets (25° C.) | Breaks | No Break | No Break | No Break |
| Tensile Strength (p.s.i., 25° C.) | 2,432 | 4,254 | 4,130 | 3,137 |
| Modulus (25° C.) | 231,846 | 88,756 | 70,318 | 49,074 |
| % Elongation (25° C.) | 3.2 | 7.7 | 15.1 | 17.2 |
| % Elongation (−12° C.) | — | 1.7 | 7.2 | 10.26 |
| Barrier to Oxygen Gas at 25°C.[1] | .030 | .14 | .80 | 4.0 |
| Melting Pt. (D.T.A.) ° C.[2] | 200 | 200 | 200 | 200 |
| Tg° C.[3] | −4 | −14 | −25 | −28 |

[1]Barrier constant permeability to O$_2$ in cc. of gas/100 in.$^2$/atm./day/mil.
[2]D.T.A. - Differential Thermal Analysis.
[3]Tg - Glass transition temperature as determined by differential thermal analysis. The Tg value for the elastomer used was −40° C.

EXAMPLE 2

The procedure of Example 1 was repeated but using a copolymer of 85 weight percent vinylidene chloride and 15 weight percent vinyl chloride said copolymer having a crystalline melting point of 176° C. and a Tg of −1° C. admixed with a methylene chloride solution containing, in one instance, 0.125 gram and, in another instance, 0.138 gram of 1,3-butadiene/acrylonitrile copolymer per gram of solution; to form blends containing 5.6 weight percent and 12.7 weight percent of 1,3-butadiene/acrylonitrile copolymer, respectively. These materials each formed clear molded sheets having significantly greater flexibility than the starting vinylidene chloride copolymer. The blend containing 12.7 weight percent rubber was characterized by a crystalline melting point (Tm) of 167° C. and a glass transition temperature (Tg) of −6° C.

The above data illustrate the remarkable combination of excellent clarity, barrier properties, flexibility and physical strength of the shaped articles obtained according to the process of the present invention. Such properties are believed to result from the hereinbefore described unique structure of such polymeric compositions, wherein there exists a continuous phase of vinylidene chloride polymer, having crystalline melting peaks which are substantially identical to those observed in the starting vinylidene chloride polymer, and wherein the rubbery copolymer is randomly dispersed therein, i.e., where the rubbery copolymer is imbibed into the porous vinylidene chloride polymer without solvation of the crystalline polymer.

The data of the above examples further illustrates the large degree of improvement in physical properties imparted to the normally brittle, unmodified normally crystalline vinylidene chloride polymer when using even small amounts of nitrile containing elastomer. Further, the permanence of such improvements with time and heat treatment is an important attribute of the present invention. By way of illustration, the molded sheets prepared as described in Examples 1 and 2 herein retain their excellent clarity and flexibility even after being heated at a temperature of about 100° C. for a 5-hour period, as well as after being stored at normal room conditions for a period exceeding about four months.

By way of comparison, molded sheets prepared as described in Examples 1 and 2 but using either conventional chlorinated polyethylene or polyurethanes as the modifying copolymer, did not provide the sheet structures having the same continuity and were characterized by significantly reduced clarity. Further, by way of comparison, sheet structures prepared by admixing the specified vinylidene chloride polymer and 1,3-butadiene/acrylonitrile copolymer of Examples 1 and 2, but wherein such materials were both in powder form when admixed, were also characterized by significantly reduced continuity and clarity.

The shaped articles produced by the present invention have been specifically illustrated as compression molded film materials. It is to be understood that such articles may be in various configurations, e.g., as injection molded or extruded articles, providing the required method of blending and subsequent heating and pressure conditions are adhered to.

The articles obtained by the present invention find wide usage in the packaging industry, e.g., as meat wrapping materials for low temperature storage as well as for the bottling of carbonated beverages.

What is claimed is:

1. A process for preparing transparent shaped articles from vinylidene chloride polymer comprising the sequential steps of (1) preparing a substantially homogeneous admixture by admixing a dry, particulate, preformed starting vinylidene chloride polymer having a crystalline melting point of at least about 175° C. as determined by differential thermal analysis, with a volatile organic material which is a nonsolvent for said preformed starting vinylidene chloride polymer, said volatile organic material having dispersed or dissolved therein from about 3 to 20 percent based on vinylidene chloride polymer weight of an elastomeric copolymer of from about 70 to 74 weight percent 1,3-butadiene and about 30 to 26 weight percent acrylonitrile said copolymer having a Mooney viscosity ML-4 at 212° F of at least about 50, (2) removing said volatile organic material from the admixture and (3) thermally fabricating said admixture into a shaped article having substantially the same crystalline melting point as said preformed starting vinylidene chloride polymer and a lowered glass transition temperature with accompanying improved flexibility at temperatures of about 25° C., as compared to said preformed starting vinylidene chloride polymer.

2. The process of claim 1 wherein said vinylidene chloride polymer is a copolymer of vinylidene chloride and vinyl chloride.

3. The process of claim 1 wherein said vinylidene chloride polymer is polyvinylidene chloride polymer.

4. The process of claim 3 containing in addition thereto and in combination therewith the step of forming a shaped article from said compositions by preheating said composition to a temperature up to about 200° C. over a period of about 30 seconds in the substantial absence of pressure, then substantially immediately thereafter applying to said composition a uniformly increasing pressure up to an amount of about 20,000 p.s.i. over a period of from about 5 to 10 seconds.

5. The process of claim 1 wherein said shaped article is a compression molded polymeric film.

* * * * *